United States Patent
Morita et al.

(10) Patent No.: US 7,463,974 B2
(45) Date of Patent: Dec. 9, 2008

(54) SYSTEMS, METHODS, AND PROGRAMS FOR DETERMINING WHETHER A VEHICLE IS ON-ROAD OR OFF-ROAD

(75) Inventors: Hideaki Morita, Okazaki (JP); Makoto Hasunuma, Okazaki (JP); Yusuke Ohashi, Okazaki (JP); Motohiro Nakamura, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 410 days.

(21) Appl. No.: 11/313,625

(22) Filed: Dec. 22, 2005

(65) Prior Publication Data

US 2006/0293843 A1    Dec. 28, 2006

(30) Foreign Application Priority Data

Dec. 24, 2004  (JP)  ............................. 2004-373081

(51) Int. Cl.
*G01C 21/00* (2006.01)
*G06F 19/00* (2006.01)

(52) U.S. Cl. ................. 701/207; 701/208; 340/995.21; 342/357.08

(58) Field of Classification Search ................. 701/207, 701/208, 200, 211, 1; 342/357.08; 340/995.21, 340/995.25, 995.28, 928; 455/456.1
See application file for complete search history.

(56) References Cited

U.S. PATENT DOCUMENTS

| | | | | |
|---|---|---|---|---|
| 5,398,189 A | * | 3/1995 | Inoue et al. | ................. 701/211 |
| 5,659,476 A | | 8/1997 | LeFebvre et al. | |
| 5,790,052 A | * | 8/1998 | Grabow | ..................... 340/928 |
| 6,285,923 B1 | * | 9/2001 | Matsuda et al. | ................. 701/1 |
| 2003/0023614 A1 | | 1/2003 | Newstrom et al. | |
| 2003/0191568 A1 | | 10/2003 | Breed et al. | |

FOREIGN PATENT DOCUMENTS

JP    A-10-307037    11/1998
JP    A-2002-357431    12/2002

* cited by examiner

*Primary Examiner*—Tan Q Nguyen
(74) *Attorney, Agent, or Firm*—Oliff & Berridge, plc

(57) ABSTRACT

Systems, methods, and programs for determining whether a vehicle is off-road or on-road, store map data, determine the vehicle's current position; and obtain information about an area around the current position of the vehicle from the stored map data. The systems, methods, and programs obtain information related to a road-side zone of a road from the obtained information about the area around the current position of the vehicle, and determine that the road-side zone is crossed. The systems, methods, and programs may make an off-road determination if the determined current position of the vehicle was on-road before the crossing of the road-side zone and make an on-road determination if the current position of the vehicle was off-road before the crossing of the road-side zone.

20 Claims, 11 Drawing Sheets

SYSTEMS, METHODS, AND PROGRAMS FOR DETERMINING WHETHER A VEHICLE IS ON-ROAD OR OFF-ROAD

INCORPORATION BY REFERENCE

The disclosure of Japanese Patent Application No. 2004-373081 filed on Dec. 24, 2004 including the specification, drawings and abstract is incorporated herein by reference in its entirety.

BACKGROUND

1. Related Technical Fields

Related technical fields include systems, methods, and programs that determine whether a vehicle is off-road or on-road. Related technical fields include navigation systems.

2. Related Art

Conventional navigation systems, such as that disclosed in Japanese Patent Application Publication No. JP-A-10-307037, determine that a vehicle is no longer on the road, i.e., is off-road. By determining that the vehicle is off-road, the system may prevent erroneous map matching. For example, when the vehicle is always assumed to be on-road, the current position is assumed to being on a closest road that is recorded as map data, even when the vehicle is actually far from any road recorded in the map data.

Conventional navigation systems, such as that disclosed in Japanese Patent Application Publication No. JP-A-2002-357431, create and store driving route data in response to a command to store an off-road driving route and can read and display the off-road running path at a later date.

SUMMARY

The above systems attempt to prevent erroneous map matching by determining an angle error of road directional data. The angle error indicates a measured error between the road direction at the current position and the distance and direction the vehicle has moved. The system then determines whether the vehicle is off-road depending on whether the absolute value of the angle error is greater than a predetermined angle error. Accordingly, the systems cannot make an off-road determination unless the vehicle has traveled a predetermined distance. As a result, not only is the system unable to make an off-road determination rapidly, but it is also unable to accurately determine the position off-road.

Also, in the above systems, if the system makes the off-road determination based on a user setting, operation is troublesome and complicated and deviation may occur depending on the setting.

In view of at least one or more of the foregoing problems, it is beneficial to enable an off-road determination and an on-road determination to be made both accurately and rapidly without delay.

Various exemplary implantations of the broad principles described herein provide systems, methods, and/or programs for determining whether a vehicle is off-road or on-road, that may store map data, determine the vehicle's current position; and obtain information about an area around the current position of the vehicle from the stored map data. The systems, methods, and/or programs may obtain information related to a road-side zone of a road from the obtained information about the area around the current position of the vehicle, and determine that the road-side zone is crossed. The systems, methods, and/or programs may make an off-road determination if the determined current position of the vehicle was on-road before the crossing of the road-side zone and make an on-road determination if the current position of the vehicle was off-road before the crossing of the road-side zone.

BRIEF DESCRIPTION OF THE DRAWINGS

Exemplary implementations will now be described with reference to the accompanying drawings, wherein.

DETAILED DESCRIPTION OF EMBODIMENTS

Figure 1:
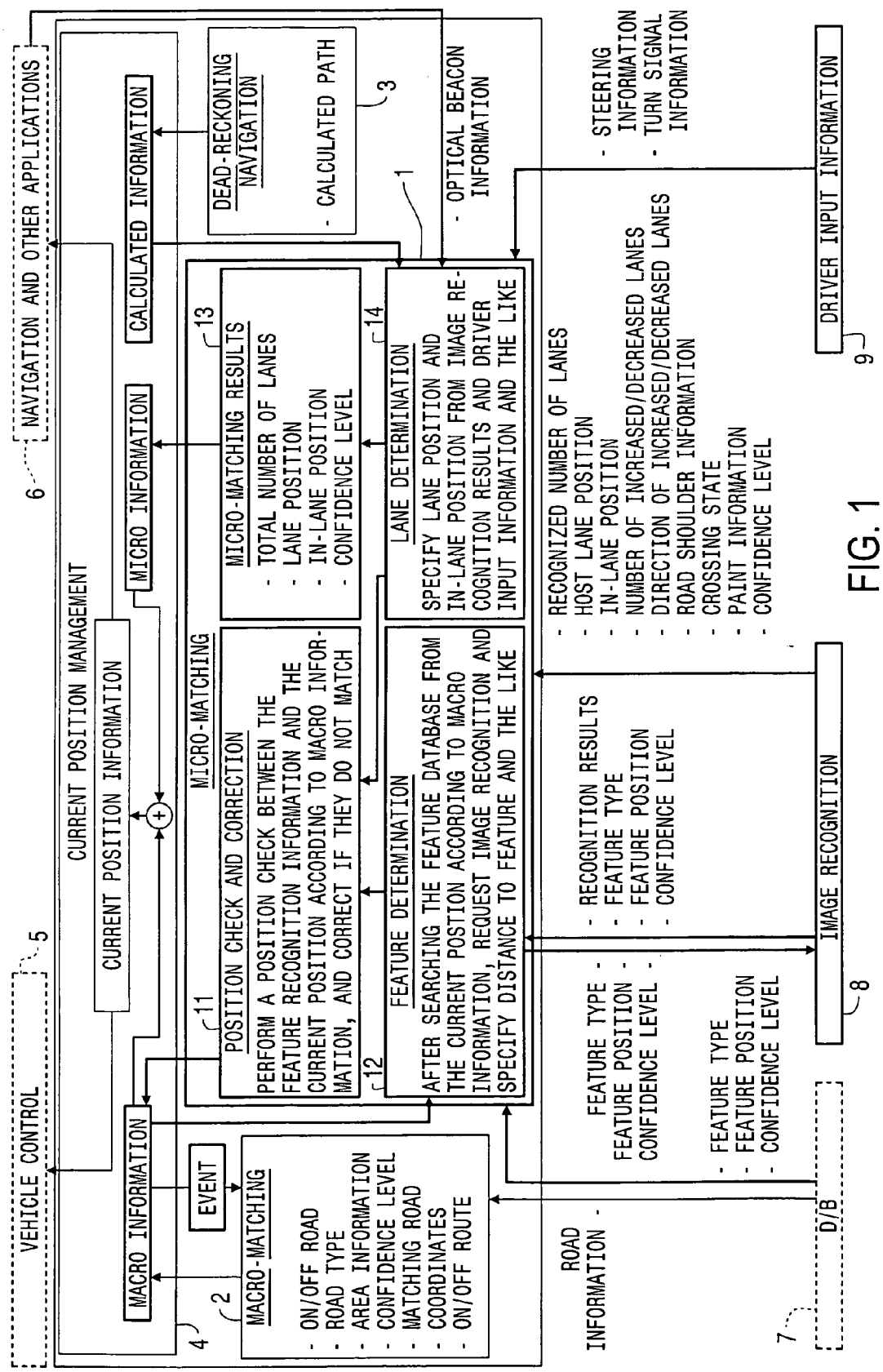
FIG. 1 is a view of an exemplary vehicle current position information management system.

FIG. 1 shows an exemplary vehicle current position information management system. The vehicle current position information management system may physically, functionally, and or conceptually include, for example, a micro-matching processing portion 1, a macro-matching processing portion 2, a dead-reckoning navigation processing portion 3, a current position managing portion 4, a vehicle control unit 5, a vehicle information processing unit 6, a database 7, an image recognition device 8, a driver input information managing unit 9, a position checking and correcting portion 11, a feature determining portion 12, a micro-matching results portion 13, and a lane determining portion 14.

The dead-reckoning navigation processing portion 3 may obtain a calculated path by calculating the direction and distance of a host vehicle from various sensor data, including, for example, vehicle speed data, G (acceleration) data, gyro data, and/or GPS data, The dead-reckoning navigation processing portion 3 may also calculate the current host vehicle position. The dead-reckoning navigation processing portion 3 then may sends the calculated information to, for example, the current position managing portion 4. The host vehicle position obtained in this manner may not match a road in the map data because the calculated path is obtained directly by using sensor data and has not been matched with the map data.

The macro-matching processing portion 2 may use a road map in the database 7 and a conventional calculated path obtained by the dead-reckoning navigation processing portion 3 as a base, and may more accurately estimate which road the host vehicle is traveling on using, for example, database information and/or new device information, in addition to the map matching routine. The macro-matching processing portion 2 may manage, as macro information, information such as, for example, whether the vehicle is on the road or off the road, road type, area information, confidence level (i.e., degree of updatedness, reliability, accuracy, and degree of certainty regarding the information viewed from the time of update), matching road, coordinates, and/or whether the vehicle is on the route or off the route, and may send that macro information to the current position managing portion 4.

The micro-matching processing portion 1 may manage the detailed position of the host vehicle in a small area. The micro-matching processing portion 1 may mainly perform feature determination based on image recognition, as well as perform lane determination based on, for example, calculated information, optical beacon information, driver input information, and/or image recognition. The micro-matching processing portion 1 may perform a position check using the results of the lane determination and feature determination, may performs correction of the current position according to macro information, and may creates and/or manage, as micro information, the in-lane position (i.e., the position of the vehicle in the lane), host lane position (i.e., the position of the lane, with respect to the road, in which the vehicle is traveling), and/or the total number of lanes from the micro-matching results. The micro-matching processing portion 1 may then send the micro information to, for example, the current position managing portion 4.

The feature information may include information about various structures relating to the road, such as, for example, stoplights, overpasses, road signs, streetlights, poles, electrical poles, guard rails, road shoulders, sidewalk steps, medians, manholes in the road, and/or paint (i.e., such as that of center lines, vehicle lanes, left/right turns and proceeding straight ahead, stop lines, bicycle crossings, crosswalks). Because the feature information may have feature types, feature positions, their update times, and/or the reliability of the information itself as the confidence level (i.e., degree of updatedness, reliability, accuracy, and degree of certainty regarding the information viewed from the time of update), if a feature is recognized as a result of image recognition, the current position can be corrected with high accuracy based on the position of that feature.

The current position managing portion 4 may manage micro information obtained by the micro-matching processing portion 1, macro information obtained by the macro-matching processing portion 2, and calculated information obtained by the dead-reckoning navigation processing portion 3 and may send that information to the micro-matching processing portion 1 and the macro-matching processing portion 2 as appropriate. The current position managing portion 4 may also create current position information from the macro information and micro information and may send it, for example, to the vehicle control unit 5 and the vehicle information processing unit 6.

The vehicle control unit 5 may perform vehicle control such as, for example, speed control and/or brake control when cornering based on the current position information obtained by the current position managing portion 4. The vehicle information processing unit 6 may include, for example, a navigation system, VICS®, and/or other application system that may display a route by showing, for example, characteristic objects and/or intersections up to the destination based on, for example, current position information obtained by the current position managing portion 4. The database 7 may be stored in a memory, and may store data relating to, for example, the confidence level, the positions and types of features of each road, and various road data.

The image recognition device 8, for example, may scan images in the direction of travel of the vehicle with a camera, may recognize paint information on the road, and may send, for example, the recognized number of lanes, host lane position, in-lane position, number of increased/decreased lanes, direction of increased/decreased lanes, road shoulder information, crossing state, paint information, and/or confidence level to the micro-matching processing portion 1 as an event. Moreover, the image recognition device 8 may perform recognition processing of features designated in accordance with a demand from the micro-matching processing portion 1 and may send, for example, the recognition results, feature types, feature positions, and/or confidence level to the micro-matching processing portion 1.

The driver input information managing portion 9 may detect, for example, with a steering angle sensor, a steering angle following an operation of a steering wheel by a driver, as well as detect left-right turn commands from a direction indicator. The driver input information managing portion 9 may send the steering information and turn signal information to the micro-matching processing portion 1 as an event.

Figure 2:
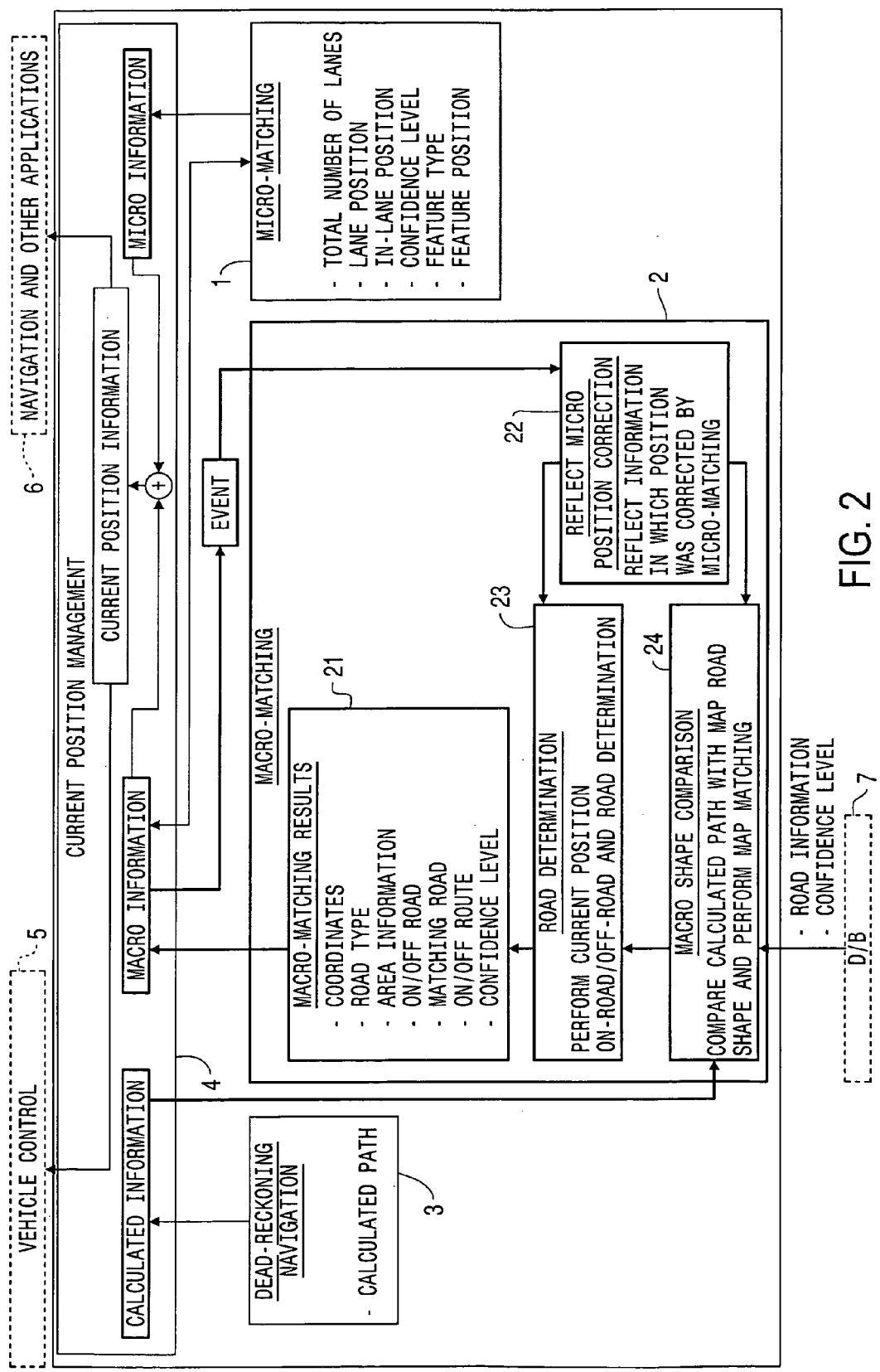
FIG. 2 is a view of an exemplary structure of a macro-matching processing portion.
Figure 3:
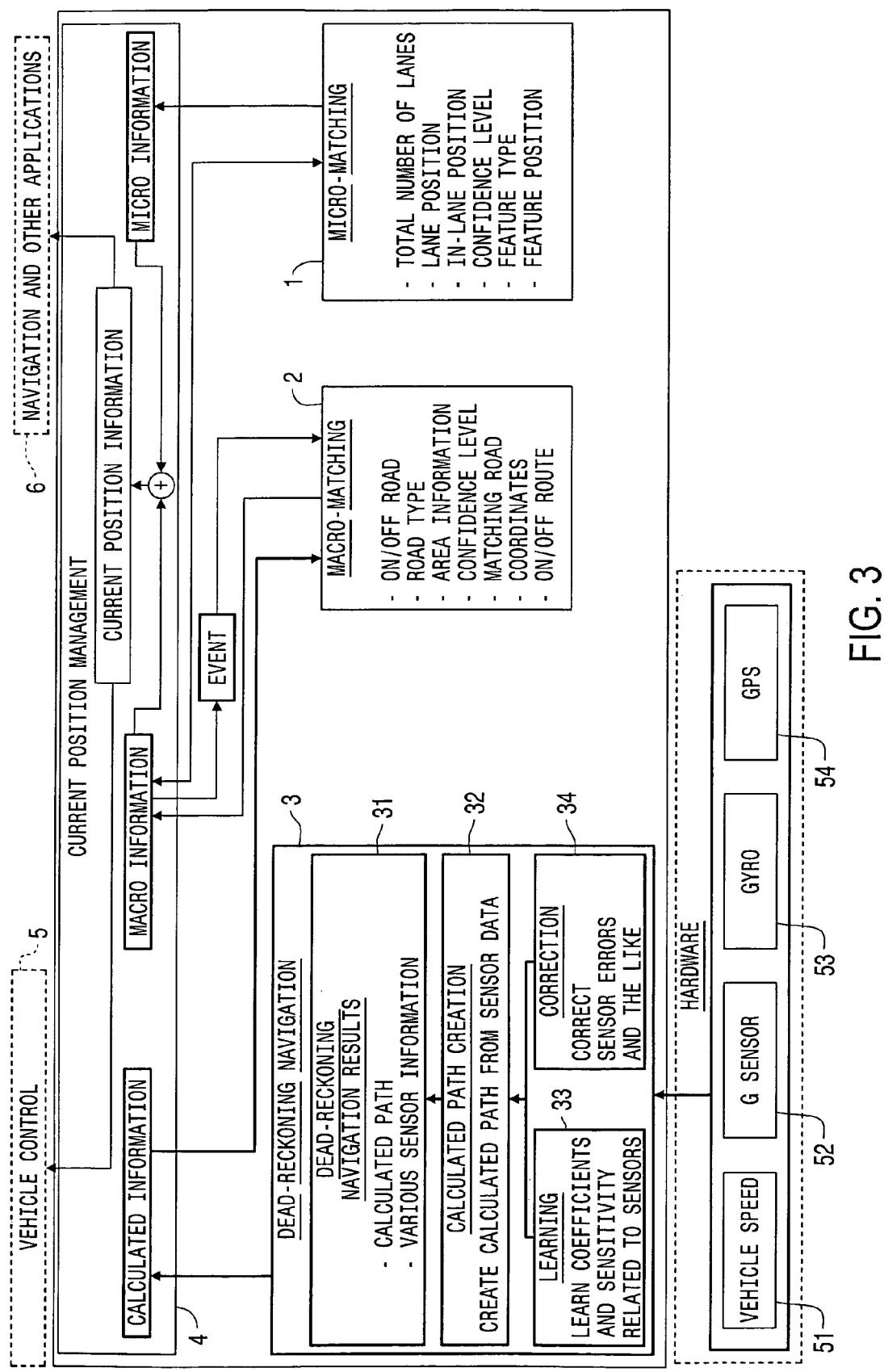
FIG. 3 is a view of an example structure of a dead-reckoning navigation processing portion.

Exemplary structures of the micro-matching processing portion 1, the macro-matching processing portion 2, and the dead-reckoning navigation processing portion 3 will be described with reference to FIGS. 2 and 3. FIG. 2 shows an exemplary structure of the macro-matching processing portion and FIG. 3 shows an exemplary structure of the dead-reckoning navigation processing portion.

As shown in FIG. 1, the micro-matching processing portion 1 may include, for example, a position checking and correcting portion 11, a feature determining portion 12, a micro-matching results portion 13, and a lane determining portion 14. The feature determining portion 12 may, for example, search the database 7 for a feature based on the current position according to macro information, request image recognition of that feature from the image recognition device 8 according to feature type, feature position, and confidence level, and specify the distance to the feature, for example, based on the confidence level, feature position, feature type, and recognition results obtained from the image recognition device 8. The lane determining portion 14 may, for example, specify the in-lane position and lane position of the host vehicle based on, for example, 1) an event of the recognized number of lanes, position of the host lane within those lanes, in-lane position (i.e., whether the vehicle is toward the right or left in the lane), number of increased/decreased lanes, direction of increased/decreased lanes, road shoulder information (e.g., the existence or absence thereof), crossing state (e.g. whether the vehicle is crossing the lane/white line), paint information (e.g. straight ahead, left/right turns, crosswalks, bicycle crossings and the like), and/or confidence level from the image recognition device 8, and/or 2) an event of the steering information and turn signal information from the driver input information managing portion 9, the calculated information of the current position managing portion 4, and/or the optical beacon information of the vehicle information processing unit 6. The micro-matching processing portion 1 may send those determination results to the position checking and correcting portion 11 and the micro-matching results portion 13.

The position checking and correcting portion 11 may, for example, check the position of the host vehicle using the feature recognition information of the feature determining portion 12 obtained by the feature determination, and further, the current position according to macro information, and the in-lane position and the lane position of the lane determining portion 14 obtained by the lane determination. If the positions based on one or more of the checked information do not match up, the position checking and correcting portion 11 may then correct the current position according to the macro information to the current position calculated based on the feature recognition information. The micro-matching results portion 13 may send the micro information, e.g., the total number of lanes, the lane position, in-lane position and confidence level of the lane determining portion 14 obtained by the lane determination, to the current position managing portion 4.

For example, when the recognition information of a manhole is obtained as a feature, for example, the position of the manhole and the distance to it may be specified from the recognition data. As a result, if the current position according to macro information and the current position of the vehicle in the direction of travel obtained from that distance do not match up, the current position according to macro information can be corrected. Also, if the current position according to macro information and current position of the host vehicle do not match up due to the position of the manhole being toward the left, right, or center, the current position according to macro information can be corrected also in the direction of the road width, not the direction of travel.

In the same way, according to lane determination, for example, when traveling on a two-lane road, if the host vehicle lane position is near the shoulder of the road and the in-lane position moves from the center of the lane toward the right and then the vehicle changes to the lane on the center line side, the current position according to macro information can be corrected if the current position of the host vehicle and the current position according to macro information do not match up. Also, if the number of lanes changes, e.g., if a right turn lane newly appears on the right side or if the number of lanes decreases from three to two or from two to one, the current position according to macro information can be corrected by performing a match determination of that position.

As shown in FIG. 2, the macro-matching processing portion 2 may include, for example, a macro-matching results portion 21, a micro position correction reflecting portion 22, a road determining portion 23, and/or a macro shape comparing portion 24. The macro shape comparing portion 24 may perform map matching by comparing the calculated path in the calculated information managed by the current position managing portion 4 with the map road shape based on the road information and confidence level of the database 7. The road determining portion 23 may determine whether the current position is on-road or off-road, and perform a road determination at the current position. The micro position correction reflecting portion 22 may reflect the correction information of the current position from the micro-matching processing portion 1 of the macro information in the current position according to the macro shape comparing portion 24 and the current position according to the road determining portion 23. The macro-matching results portion 21 may send, as macro information, the coordinates, road type, area information, on-road/off-road, matching road, on-route/off-route, and/or confidence level to the current position managing portion 4 following a road determination by the road determining portion 23.

As shown in FIG. 3, the dead-reckoning navigation processing portion 3 may include, for example, a dead-reckoning navigation results portion 31, a calculated path creating portion 32, a learning portion 33, and a correcting portion 34. The dead-reckoning navigation processing portion 3 may scan the various information from a vehicle sensor 51, a G sensor 52, a gyro 53, and GPS 54, and may create a calculated path. The dead-reckoning navigation processing portion 3 may and sends the calculated path, together with the various sensor information, to the current position managing portion 4 as calculated information. The learning portion 33 may learn the coefficient and sensitivity relating to each sensor. The correcting portion 34 may correct errors and the like of the sensors. The calculated path creating portion 32 may create a calculated path of the vehicle from the various sensor data. The dead-reckoning navigation results portion 31 may send the created calculated path of the dead-reckoning navigation results and the various sensor information to the current position managing portion 4 as calculated information.

Figure 4:
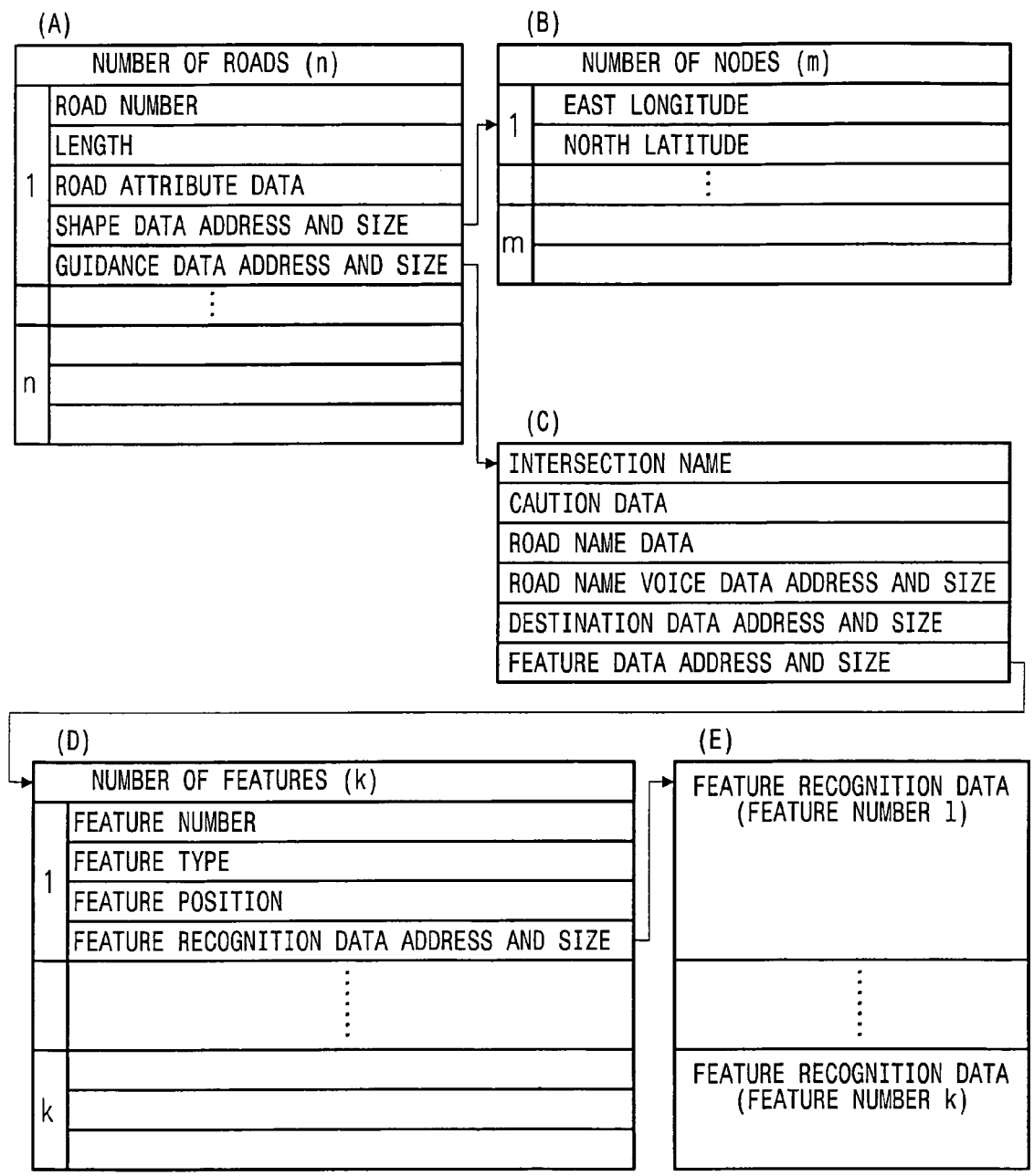
FIG. 4 shows an exemplary database.

FIG. 4 is a view illustrating an exemplary database structure. A guidance road data file may be stored in the database. As shown in FIG. 4, the guidance road data file includes road data (A), including, for example, data for the road number, length, road attribute data, the size and address of shape data, and/or the size and address of guidance data for each of n number of roads of a route searched by a route search, and is obtained by a route search and stored as data necessary for performing route guidance.

The guidance road data file includes shape data (B), including, for example, coordinate data made up of east longitude and north latitude for each of m number of nodes when each road is divided into a plurality of nodes (plots). The guidance road data file includes guidance data (C), including for example, data for names of intersections (or branching points), caution data, road name data, sizes and addresses of road name voice data, sizes and addresses of destination data, and/or sizes and addresses of feature data.

Of these, the destination data, for example, may include destination road numbers, destination names, sizes and addresses of destination name voice data and destination direction data, and/or travel guidance data. Of the destination data, the destination direction data may be data that indicates information regarding cancellation (i.e., not using destination direction data), unnecessity (i.e., no guidance), advance straight ahead, to the right, at an angle to the right, return to the right, to the left, at an angle to the left, and/or return to the left.

The guidance road data file includes feature data (D), including, for example, feature number, feature type, feature position, and/or size and address of feature recognition data for each of k number of features on each road. The guidance road data file includes feature recognition data (E), that is data necessary for recognition by each feature, e.g., shape, size, height, color, position in which it appears in the image, and/or the like.

The road number may be set differently for each road between branching points depending on the direction (outbound route, return route). The road attribute data may be road guidance assistance information data that indicates elevated road and underground road information such as whether a road is elevated, is next to an elevated road, is an underground road, and/or is next to an underground road, and/or information about the number of vehicle lanes. The road name data may be data for information about expressways, urban expressways, toll roads, public highways (national highways, prefectural highways, other), and/or information indicating through lanes and access roads of expressways, urban expressways, and/or toll roads. The road name data may include road type data as well as type internal numbers that are individual number data for each type of road.

Figure 5:
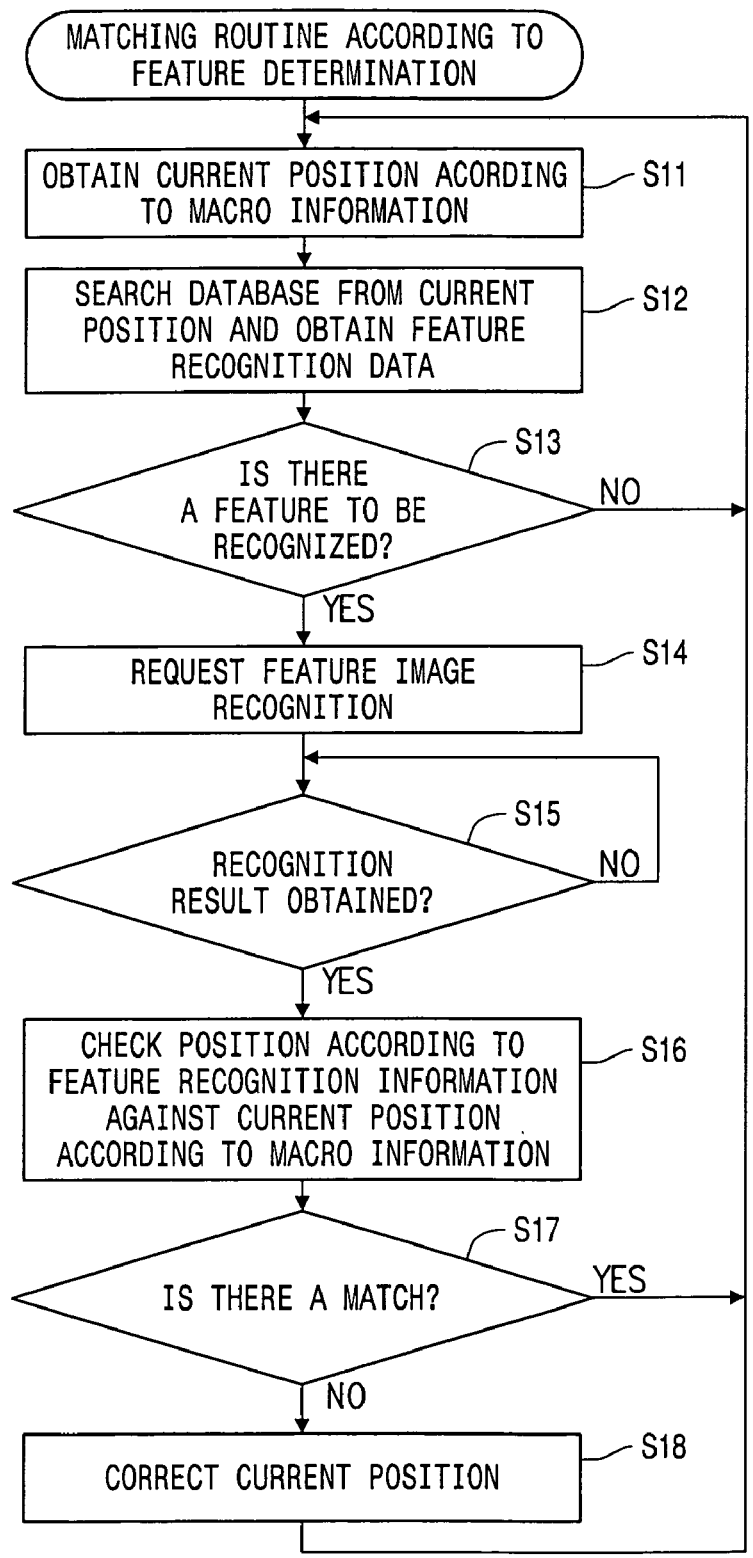
FIG. 5 shows an exemplary micro-matching method.

FIG. 5 is a view illustrating an exemplary micro-matching method using feature determination. The exemplary method may be implemented, for example, by one or more components of the above-described vehicle current position information management system. However, even though the exemplary structure of the above-described vehicle current position information management system may be referenced in the description, it should be appreciated that the referenced structure is exemplary and the exemplary method need not be limited by any of the above-described exemplary structure.

As shown in FIG. 5, for example, when the current position according to macro information is obtained (step S11), the database is searched from the current position and the feature recognition data is obtained (step S12). Then it is determined whether there is a feature to be recognized (step S13). If there is no feature to be recognized (step S13=no), the process returns to step S11. If there is a feature to be recognized (step S13=yes), image recognition of the feature is requested, for example, by the image recognition device 8 (step S14).

Operation of he method then waits until a recognition result is obtained from the image recognition device 8 (step S15) and, if so (step S15=yes), the current position obtained from the feature recognition information is checked against the current position according to the macro information (step S16). If the current position obtained from the feature recognition information matches the current position according to the macro information (step S17=yes), the process returns to step S11. If the current position according to the macro information does not match (step S17=no), it is corrected based on the current position obtained from the feature recognition information (step S18).

Figure 6:
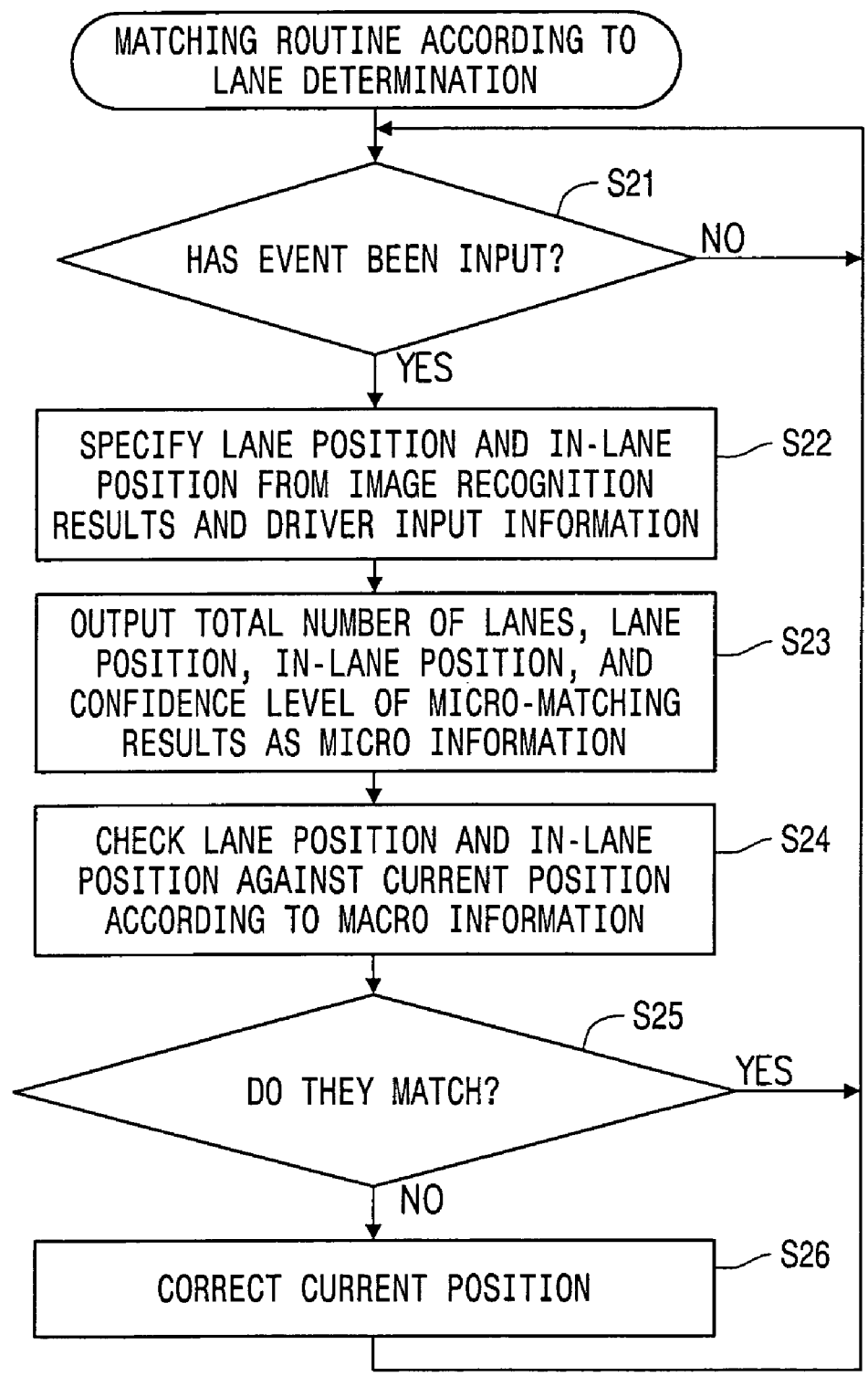
FIG. 6 shows an exemplary micro-matching method.

FIG. 6 is a view illustrating an exemplary micro-matching method using lane determination. The exemplary method may be implemented, for example, by one or more components of the above-described vehicle current position information management system. However, even though the exemplary structure of the above-described vehicle current position information management system may be referenced in the description, it should be appreciated that the referenced structure is exemplary and the exemplary method need not be limited by any of the above-described exemplary structure.

As shown in FIG. 6, for example, when an event is input from the driver input information managing portion 9 and an event is input from the image recognition device 8 (step S21=yes), the lane position and in-lane position are specified from the image recognition results and the driver input information (step S22). The total number of lanes, lane position, in-lane position, and confidence level of the micro-matching results are then output as micro information (step S23). Next, the lane position and in-lane position are checked against the current position according to macro information (step S24) and it is determined whether the lane position and in-lane position match the current position according to macro information (step S25). If the lane position and in-lane position match the current position according to macro information (step S25=yes), operation of the method returns to step S21. If it does not match (step S25=no), the current position according to macro information is corrected based on the lane position and in-lane position (step S26).

Figure 7:
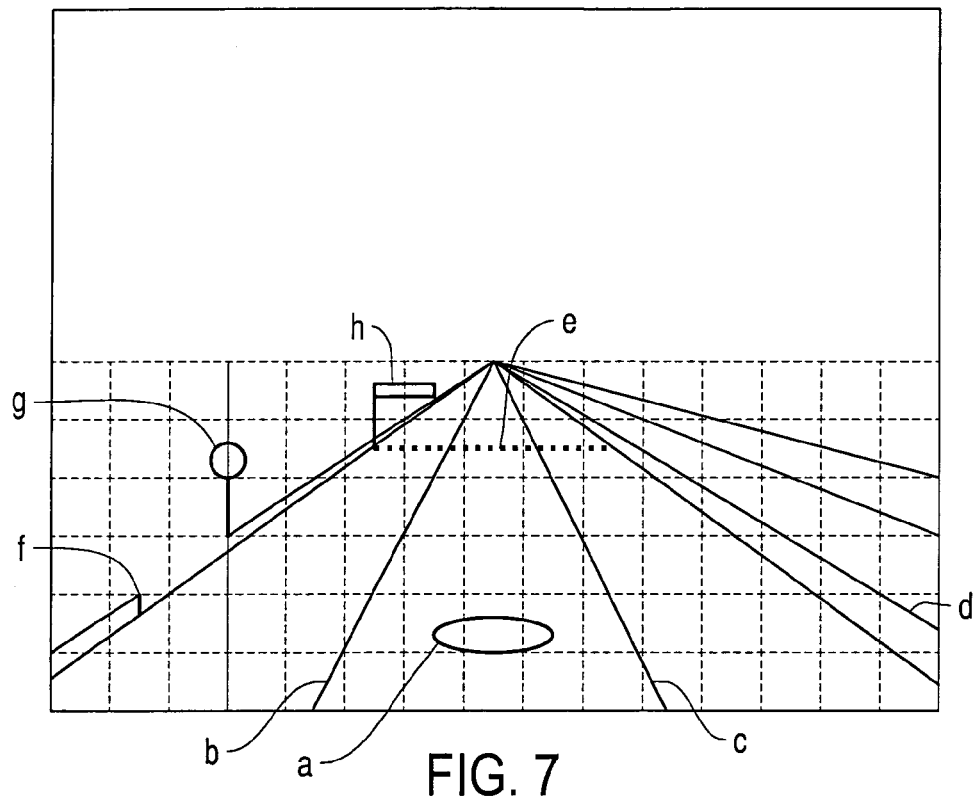
FIG. 7 shows an example of various features and paint.
Figure 8:
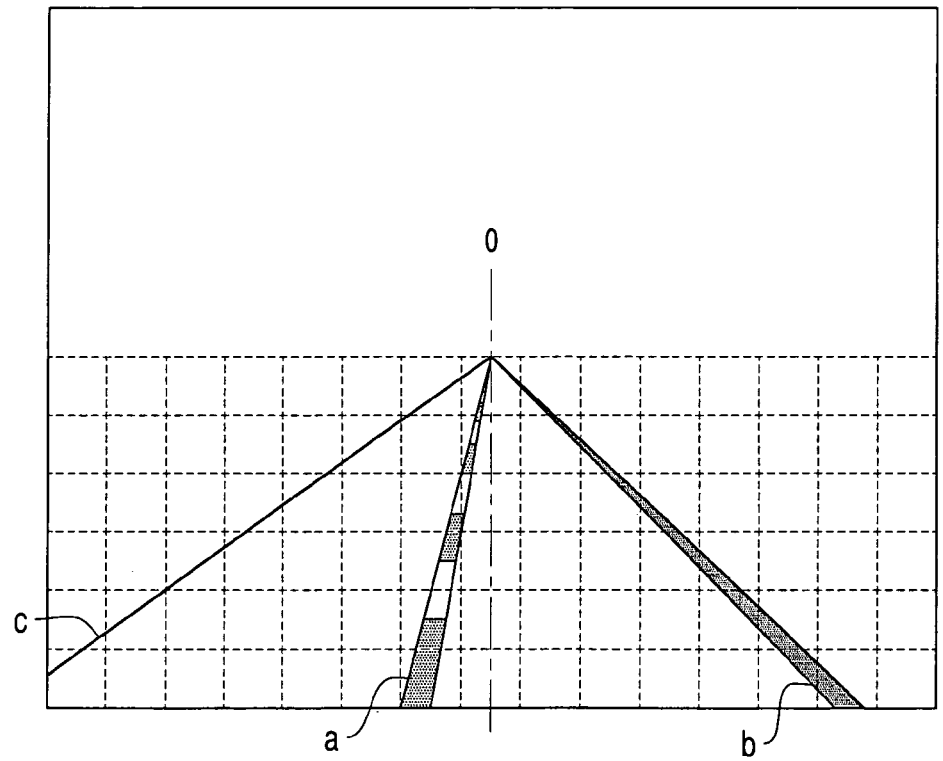
FIG. 8 is a view explaining the determination of the lane position, in-lane position, and crossing state.

FIG. 7 shows an example of various features and paint and FIG. 8 is a view explaining the determination of the lane position, in-lane position, and crossing state. The various features and paint may include, for example, a manhole (a), lanes (b and c), a median or center line (d), a stop line (e), a sidewalk step (f), a road sign (g), and a traffic signal (h). These features may be recognized, for example, from the shapes of the features, and the current position can be obtained from the recognized positions. Thus, the recognized positions of features and/or paint can be recognized by the position on a grid when the image is divided by a grid indicated with dotted lines, or specified by the field angle of the features and/or paint to be targeted. Further, the lane position, in-lane position, and/or crossing state can be determined from the position of the bottom point of the lane marking (white line) a, the center line b, and the road shoulder c on the image, as shown in FIG. 8.

Figure 9:
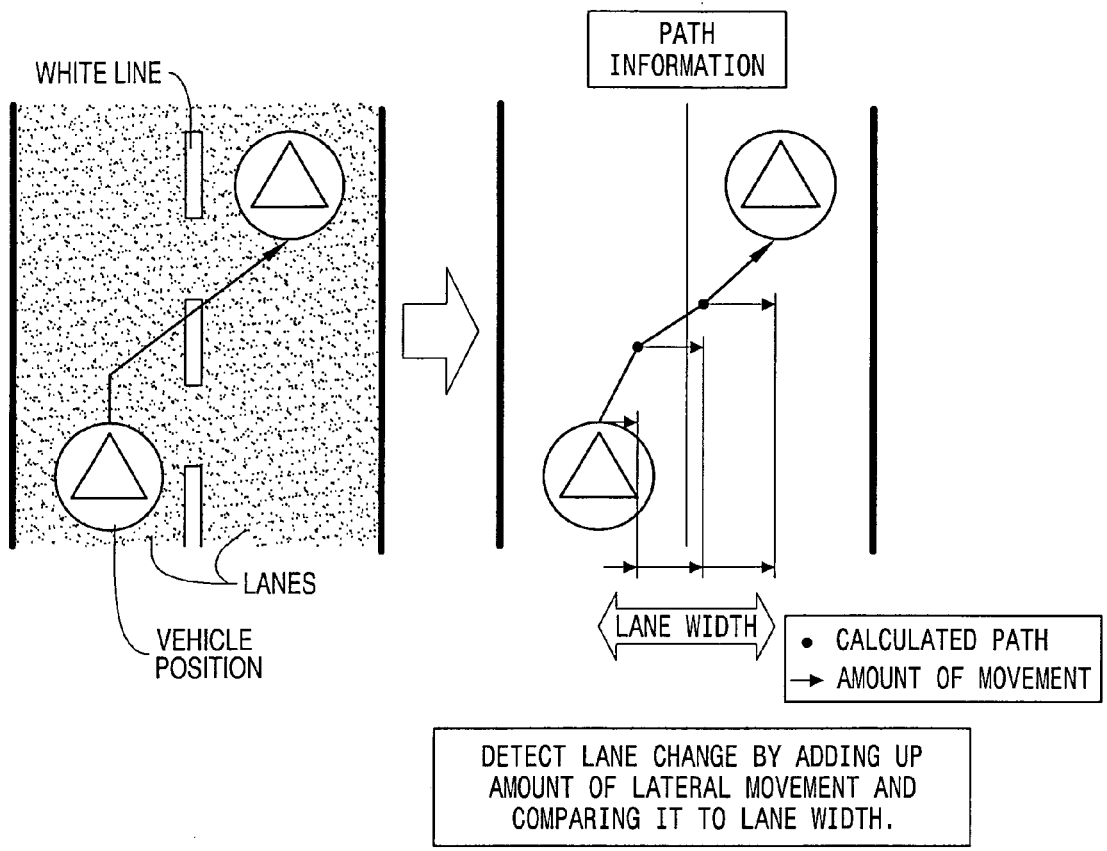
FIG. 9 shows an exemplary determination of the lane position, in-lane position, and crossing state using a calculated path.

FIG. 9 shows an exemplary determination of the lane position, in-lane position, and crossing state using a calculated path. Even if the image recognition device 8 is unable to be used, the calculated path and optical beacon can still be used to determine the lane position, in-lane position, and crossing state. In a case where the calculated path is used, as shown in FIG. 9, for example, by monitoring the calculated information (i.e., the path or the amount of left-right movement) with the current position managing portion 4, e.g., by adding up the amount of movement in the width direction of the lane and comparing it to the lane width, a determination of a lane change may be made if the amount of movement is equal to the lane width, and at half-way a determination of a crossing state may be made. A correction may also be made to compensate for the in-lane position being toward the left or toward the right.

Figure 10:
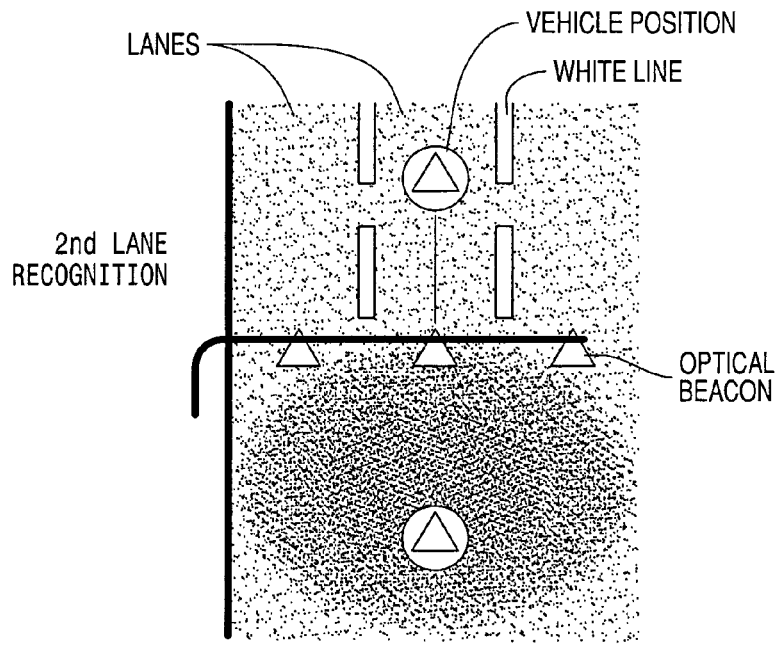
FIG. 10 shows exemplary determination of the lane position, in-lane position, and crossing state using an optical beacon.

FIG. 10 shows exemplary determination of the lane position, in-lane position, and crossing state using an optical beacon. The information related to the lane is included in the optical beacon, so the optical beacon shown in FIG. 10 can be used irrespective of whether or not there is a camera and image recognition device. Moreover, with image recognition there are also cases in which the total number of lanes is unable to be identified, so optical beacon information is given priority. Also, the final lane determination result is determined by combining the current determined lane position and the optical beacon information. If the information does not match up, the confidence level may be lowered, for example.

Figure 11A:
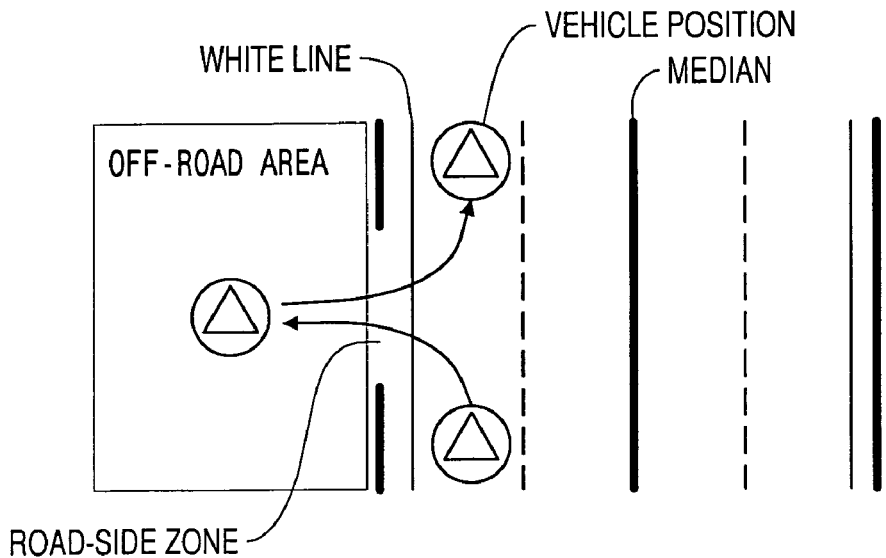
FIGS. 11A and 11B show a general outline of an off-road/on-road determination based on the road-side zone determination.
Figure 11B:
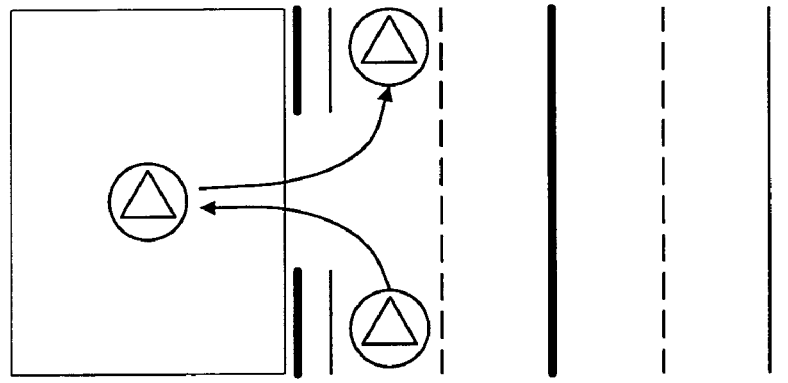

As discussed above, the off-road determination/on-road determination may be made, for example, by using the determination of the host lane position, the in-lane position, lane change, and/or the like. FIGS. 11A and 11B show a general outline of an off-road/on-road determination based on the road-side zone determination. When there is a white line in a road-side zone, as shown in FIG. 11A, for example, an off-road determination may be made if it has been determined that the vehicle has moved from a road to an off-road area following detection of a white line crossing by image recognition by a camera. Conversely, an on-road determination may be made if it has been determined that the vehicle has moved from an off-road area to a road following detection of a white line crossing by image recognition by a camera.

Figure 12:
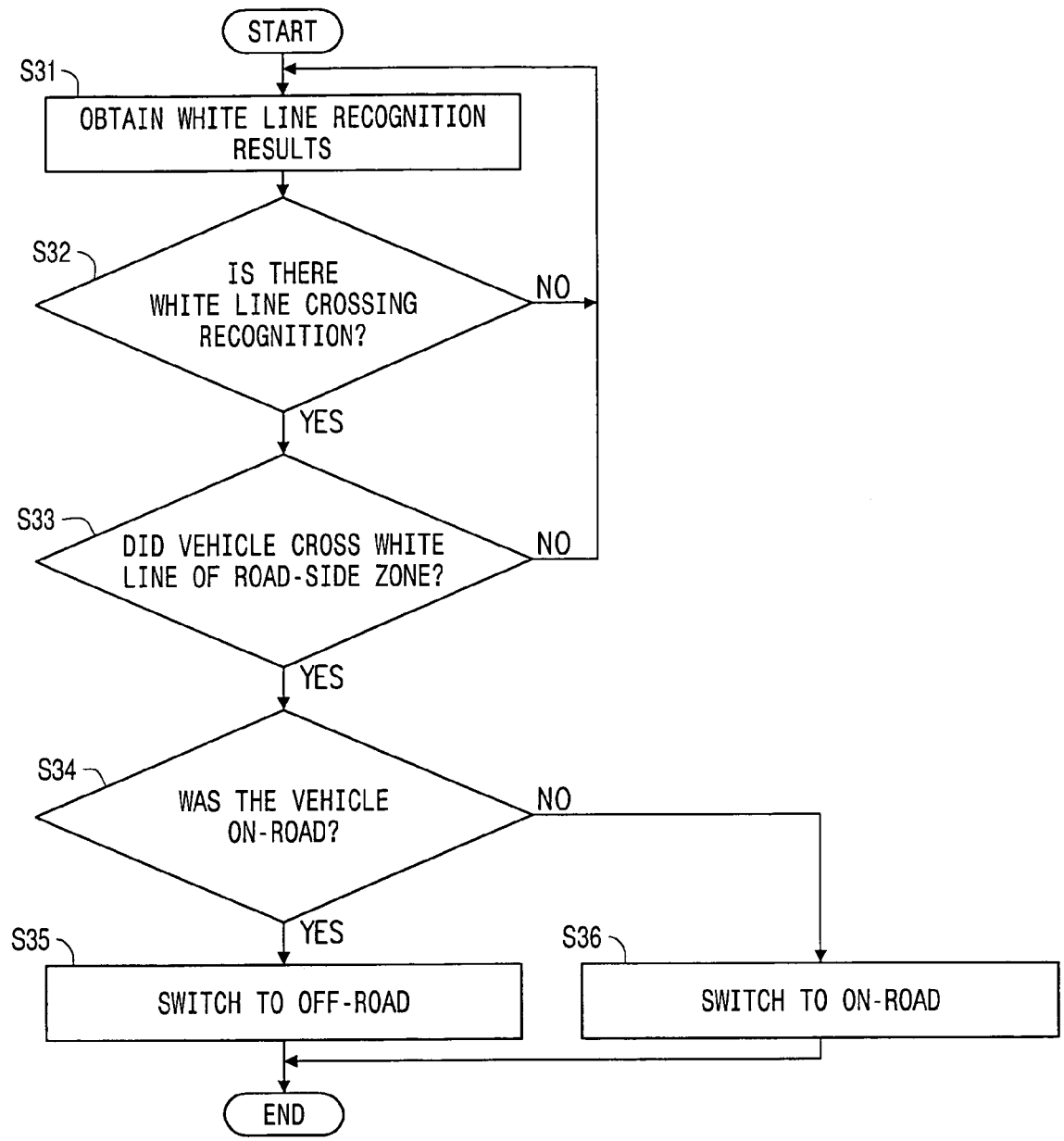
FIG. 12 shows an exemplary off-road/on-road determination method based on a determination of a road-side zone with a white line.

FIG. 12 shows an exemplary off-road/on-road determination method based on a determination of a road-side zone with a white line. The exemplary method may be implemented, for example, by one or more components of the above-described vehicle current position information management system. However, even though the exemplary structure of the above-described vehicle current position information management system may be referenced in the description, it should be appreciated that the referenced structure is exemplary and the exemplary method need not be limited by any of the above-described exemplary structure.

Accordingly, in this case, as shown in FIG. 12, information about the area around the current position of the vehicle may be obtained from map data, and white line information relating to the road-side zone of the road may be obtained from that information about the area around the current position. A white line recognition result may then be obtained by image recognition with a camera (step S31), recognition of white line crossing may be performed (step S32=yes), and a determination may be made as to whether the vehicle has crossed the road-side zone of the road by this white line crossing detection (step S33). If crossing of the road-side zone of the road has been determined by the white line crossing detection (step S33=yes), and further, depending on whether the vehicle was on-road (step S34=yes), a switch to off-road may be made (step S35). If the vehicle was on-road (step S34=yes), a switch to on-road is made (step S36).

Further, when there is no white line in the road-side zone as shown in FIG. 11B, lane departure may be determined using the determination of the host lane position, in-lane position, lane change, and/or the like described above. An off-road determination may be made when lane departure has been determined, and an on-road determination may be made based on the calculated path when the vehicle is determined to be off-road.

Figure 13:
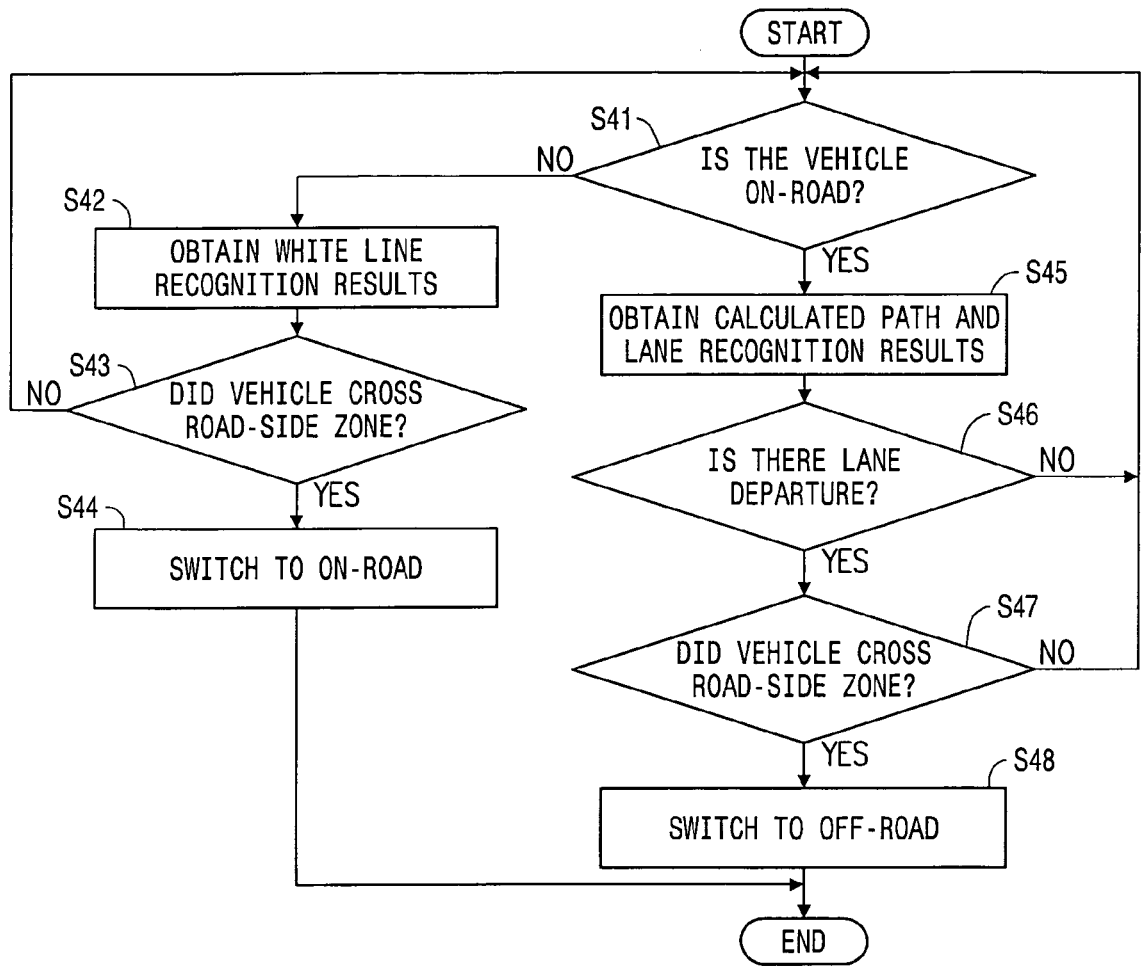
FIG. 13 shows an exemplary off-road/on-road determination method based on a determination of a road-side zone without a white line.

FIG. 13 shows an exemplary off-road/on-road determination method based on a determination of a road-side zone without a white line. The exemplary method may be implemented, for example, by one or more components of the above-described vehicle current position information management system. However, even though the exemplary structure of the above-described vehicle current position information management system may be referenced in the description, it should be appreciated that the referenced structure is exemplary and the exemplary method need not be limited by any of the above-described exemplary structure.

In this case, as shown in FIG. 13, a determination is first made as to whether the vehicle is on-road (step S41). If the vehicle is determined not to be on-road (step S41 =no), then a calculated path is obtained (step S42). It is then determined whether the vehicle has crossed the road-side zone (step S43). If it is determined that the vehicle has crossed the road-side zone (step S43=yes), a switch to on-road is made (step S44). However, if it is determined that the vehicle is on-road (step 41=yes), then a calculated path and lane recognition results are obtained (step S45). It is then determined whether the vehicle has departed from the lane and whether the vehicle has crossed the road-side zone (steps S46 and S47). If it is determined that the vehicle has departed from the lane and crossed the road-side zone (steps S46 and S47=yes), a switch is made to off-road (step S48).

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in the examples described above, the on-road determination/off-road determination may be made based on white line crossing detection and lane departure and the like. Alternatively, however, the G at a step of a sidewalk may be detected or the steering angle may be detected and the determination may be made according to an off-road area, on-road area, and/or branch or the like. Also, in order to increase the determination accuracy, two or more determinations from among the on-road/off-road determination by white line crossing detection, off-road determination by lane departure, on-road determination based on a calculated path, on-road/off-road determination according to steering or a turn signal, and/or on-road/off-road determination according to sidewalk step detection may be used.

Furthermore, although the vehicle current position information management system as being composed of a micro-matching processing portion 1, a macro-matching processing portion 2, a dead-reckoning navigation processing portion 3, a current position managing portion 4, a vehicle control unit 5, a vehicle information processing unit 6, an image recognition device 8, a driver input information managing unit 9, a position checking and correcting portion 11, a feature determining portion 12, a micro-matching results portion 13, and a lane determining portion 14, one or more of the components may be further divided and/or combined as necessary. For example, each component may be implemented using a controller, such as, for example, a CPU or by a program stored in a storage medium.

What is claimed is:

1. A system that determines whether a vehicle is off-road or on-road, comprising:
a memory that stores map data; and
a controller that:
determines the vehicle's current position;
obtains information about an area around the current position of the vehicle from the stored map data;
obtains information related to a road-side zone of a road from the obtained information about the area around the current position of the vehicle;
determines that the road-side zone is crossed;
makes an off-road determination if the determined current position of the vehicle was on-road before the crossing of the road-side zone; and
makes an on-road determination if the current position of the vehicle was off-road before the crossing of the road-side zone.

2. The system of claim 1, wherein the controller determines that the road-side zone is crossed by recognizing an image captured by a camera and detecting the crossing of the road-side zone based on the captured image.

3. The system of claim 1, wherein the controller determines that the road-side zone is crossed by recognizing an image captured by a camera and detecting a departure of the vehicle from the traveling lane based on the captured image.

4. The system of claim 1, wherein the controller determines that the road-side zone is crossed based on a calculated path.

5. The system of claim 1, wherein the controller determines that the road-side zone is crossed by detecting a sidewalk step.

6. The system of claim 1, wherein the controller determines that the road-side zone is crossed based on a signal received from an optical beacon.

7. The system of claim 1, wherein the controller determines that the road-side zone is crossed based on the location of a road sign.

8. The system of claim 1, wherein the controller determines that the road-side zone is crossed based on the location of a traffic signal.

9. The system of claim 1, wherein the controller determines that the road-side zone is crossed based on the location of a painted line.

10. A navigation system comprising the-system of claim 1.

11. A method for determining whether a vehicle is off-road or on-road, comprising:
storing map data;
determining the vehicle's current position;
obtaining information about an area around the current position of the vehicle from the stored map data;
obtaining information related to a road-side zone of a road from the obtained information about the area around the current position of the vehicle;
determining that the road-side zone is crossed;
making an off-road determination if the determined current position of the vehicle was on-road before the crossing of the road-side zone; and making an on-road determination if the current position of the vehicle was off-road before the crossing of the road-side zone.

12. The method of claim 11, wherein determining that the road-side zone is crossed comprises:
recognizing an image captured by a camera; and
detecting the crossing of the road-side zone based on the captured image.

13. The method of claim 11, wherein determining that the road-side zone is crossed comprises:
recognizing an image captured by a camera; and
detecting a departure of the vehicle from the traveling lane based on the captured image.

14. The method of claim 11, further comprising:
calculating a path;
wherein determining that the road-side zone is crossed comprises determining that the road-side zone is crossed based on the calculated path.

15. The method of claim 11, further comprising:
detecting a sidewalk step;
wherein determining that the road-side zone is crossed comprises determining that the road-side zone is crossed based on the detected sidewalk step.

16. The method of claim 11, further comprising:
receiving a signal from an optical beacon;
wherein determining that the road-side zone is crossed comprises determining that the road-side zone is crossed based on the received signal.

17. The method of claim 11, further comprising:
determining the location of a road sign;
wherein determining that the road-side zone is crossed comprises determining that the road-side zone is crossed based on the location of the road sign.

18. The method of claim 11, further comprising:
determining the location of a traffic signal;
wherein determining that the road-side zone is crossed comprises determining that the road-side zone is crossed based on the location of the traffic signal.

19. The method of claim 11, further comprising:
determining the location of a painted line;
wherein determining that the road-side zone is crossed comprises determining that the road-side zone is crossed based on the location of the painted line.

20. A storage medium storing a set of program instructions executable on a data processing device and usable for determining whether a vehicle is off-road or on-road, the instructions comprising:
instructions for storing map data;
instructions for determining the vehicle's current position;
instructions for obtaining information about an area around the current position of the vehicle from the stored map data;
instructions for obtaining information related to a road-side zone of a road from the obtained information about the area around the current position of the vehicle;
instructions for determining that the road-side zone is crossed;
instructions for making an off-road determination if the determined current position of the vehicle was on-road before the crossing of the road-side zone; and
instructions for making an on-road determination if the current position of the vehicle was off-road before the crossing of the road-side zone.

* * * * *